United States Patent
Pollock et al.

(10) Patent No.: US 9,574,499 B2
(45) Date of Patent: Feb. 21, 2017

(54) COMBINED BUTTERFLY/BALL VALVE

(71) Applicants: Shawn J. Pollock, Timnath, CO (US); Aaron W. Hrdlichka, Fort Collins, CO (US); Brian E. Hoemke, Rockford, IL (US); Harold W. Williams, Ault, CO (US)

(72) Inventors: Shawn J. Pollock, Timnath, CO (US); Aaron W. Hrdlichka, Fort Collins, CO (US); Brian E. Hoemke, Rockford, IL (US); Harold W. Williams, Ault, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 14/710,688

(22) Filed: May 13, 2015

(65) Prior Publication Data

US 2016/0333795 A1 Nov. 17, 2016

(51) Int. Cl.

| F16K 11/04 | (2006.01) |
| F02C 9/18 | (2006.01) |
| F16K 1/22 | (2006.01) |
| F16K 1/226 | (2006.01) |
| F16K 5/06 | (2006.01) |
| F16K 5/12 | (2006.01) |
| F16K 11/052 | (2006.01) |
| F16K 11/056 | (2006.01) |

(52) U.S. Cl.
CPC .............. *F02C 9/18* (2013.01); *F16K 1/222* (2013.01); *F16K 1/2261* (2013.01); *F16K 1/2263* (2013.01); *F16K 5/0684* (2013.01); *F16K 5/0689* (2013.01); *F16K 5/12* (2013.01); *F16K 11/052* (2013.01); *F16K 11/056* (2013.01); *F05D 2220/30* (2013.01); *F05D 2240/20* (2013.01); *F05D 2260/606* (2013.01)

(58) Field of Classification Search
USPC .............................. 137/625.46; 251/118, 121
See application file for complete search history.

(56) References Cited

U.S. PATENT DOCUMENTS

| 4,029,295 A * | 6/1977 | Wassmer | ................... F16K 7/18 |
| | | | 137/625.44 |
| 4,156,439 A * | 5/1979 | Jeffries | ............... F16K 11/0525 |
| | | | 137/625.46 |

(Continued)

FOREIGN PATENT DOCUMENTS

| EP | 1 944 535 A2 | 7/2008 |
| FR | 2 919 674 A1 | 2/2009 |

*Primary Examiner* — John Fox
(74) *Attorney, Agent, or Firm* — Reinhart Boerner Van Deuren P.C.

(57) ABSTRACT

A valve and valve assembly having a hybrid valve member are provided. The valve includes a housing, with an inlet, a primary outlet, and a secondary outlet. The hybrid valve member is rotatably positioned within the housing. The hybrid valve member has a fully closed position wherein the hybrid valve member prevents flow between the inlet and the primary outlet and prevents flow between the inlet and the secondary outlet. The hybrid valve member includes a planar portion and a hemispherical portion on a first side thereof. The planar portion faces the inlet in the fully closed position and the hemispherical portion faces the secondary outlet in the fully closed position.

10 Claims, 9 Drawing Sheets

(56) References Cited

U.S. PATENT DOCUMENTS

| | | | |
|---|---|---|---|
| 4,273,157 A * | 6/1981 | Ludwig | B60H 1/00314 |
| | | | 137/625.46 |
| 4,465,259 A * | 8/1984 | Allen | F16K 5/0615 |
| | | | 137/625.46 |
| 5,437,307 A | 8/1995 | Cianfrocca, II | |
| 6,047,950 A * | 4/2000 | Pontoppidan | F02D 9/10 |
| | | | 123/337 |
| 6,135,414 A | 10/2000 | Mohtar | |
| 6,971,632 B2 * | 12/2005 | Elliot | F02D 9/1015 |
| | | | 123/337 |

\* cited by examiner

COMBINED BUTTERFLY/BALL VALVE

FIELD OF THE INVENTION

This invention generally relates to turbine engines, and more specifically to apparatus and methods for modulating bleed air from the compressor stages of a turbine engine.

BACKGROUND OF THE INVENTION

It is generally known in the art to syphon or "bleed" air from a compressor section of a turbine engine upstream from the combustion section. Such bleed air is used for a variety of functions including but not limited to cabin pressurization, engine operability, powering of pneumatic actuators, anti-icing, etc.

Many contemporary systems modulate such bleed air through the use of multiple air valves. Each air valve is in fluid communication with a certain portion of the compressor section. Controlling the restriction offered by the internal metering element of each air valve controls the amount of bleed air that is allowed to flow from the compressor section. This modulated bleed air flows from each air valve to its appropriate destination to achieve one or more of the exemplary functions identified above.

Unfortunately, such contemporary systems are complex. Indeed, they typically involve multiple stand-alone air valves each having an independent actuator, or at least multiple separate metering elements controlled by a single actuator, each being connected to the single actuator by way of a relatively complex linkage. As one example, a stage of compressor section may utilize two stand-alone air valves each having an actuator, or a single valve having two metering elements therein which are connected by way of a linkage to a single actuator. While the above systems have proven to sufficiently modulate bleed air, they also have a large overall engine foot print, have a large part count, are generally complex in their linkages, and tend to be high cost.

Recent designs have included a single metering element that allows for a primary bleed air function as well as a secondary function. While such systems present a significant improvement over existing designs, the applicant has found that for smaller bleed valve port sizes, on the order of about two inch port diameter, (i.e. smaller bleed functions) such designs are not as efficient in terms of space and weight. That is, despite this smaller bleed function, such systems require a sufficiently large actuator to deal with internal resistive torque on the metering element. For smaller bleed functions, there is an expectation of smaller size and weight envelope as well, however. As such, there is a need in the art for an apparatus and method that modulates bleed air in smaller bleed applications that presents a reduced amount of internal frictional forces and resistive torque so as to reduce overall actuator size requirements.

The invention provides such an apparatus and method. These and other advantages of the invention, as well as additional inventive features, will be apparent from the description of the invention provided herein.

BRIEF SUMMARY OF THE INVENTION

In one aspect, a valve is provided which provides advantages of a butterfly valve as well as a ball valve in a single package. An embodiment of such a valve according to this aspect includes a housing. The housing has an inlet, a primary outlet, and a secondary outlet. A hybrid valve member is rotatably positioned within the housing. The hybrid valve member has a fully closed position wherein the hybrid valve member prevents flow between the inlet and the primary outlet and prevents flow between the inlet and the secondary outlet. The hybrid valve member includes a planar portion and a hemispherical portion on a first side thereof. The planar portion faces the inlet in the fully closed position and the hemispherical portion faces the secondary outlet in the fully closed position.

In certain embodiments according to this aspect, the hybrid valve member has a second side in an opposed relationship to the first side. The second side includes a planar portion. A seal groove is interposed between the first and second sides. A seal is positioned within the seal groove and provides a radial seal between the hybrid valve member and an interior surface of the housing.

In certain embodiments according to this aspect, an aperture is formed through the hemispherical portion. The planar portion is exposed to a flow passing through the aperture. The aperture is selectively alignable with the secondary outlet such that a flow path extends between the inlet, the aperture, and the secondary outlet in at least a partially opened position of the hybrid valve member. The aperture may be an elongated slot having an open side.

The hemispherical portion may also include an internal pocket. The internal pocket is offset from a center axis of the hybrid valve member.

In certain embodiments according to this aspect, a flow feature may also be provided which extends from the planar portion of the second side of the hybrid valve member. The flow feature is positioned in an outer periphery of the hybrid valve member. The flow feature extends partially along the outer periphery of the hybrid valve member.

In addition to facing the secondary outlet in the fully closed position, the hemispherical portion may also face the inlet in the fully closed position.

In certain embodiments according to this aspect, the valve may also include a valve shoe. The valve shoe is adjacent the secondary outlet and biased against the hemispherical portion to prevent a flow from the inlet to the secondary outlet in the fully closed position.

In another aspect, a valve assembly is provided. The valve assembly includes an actuator and a valve, the actuator being mounted to the valve. The valve includes a housing having an inlet, a primary outlet, and a secondary outlet. A hybrid valve member is rotatably positioned within the housing. A valve stem is connected to the hybrid valve member and extends through the housing such that a terminal end of the valve stem is connected to the actuator. The actuator is operable to rotate the valve stem about an actuation axis to thereby rotate the hybrid valve member within the housing. The hybrid valve member includes a first side with a planar portion and a hemispherical portion. The planar portion and at least part of the hemispherical portion face the inlet in a fully closed position of the valve member. The hemispherical portion of the hybrid valve member also faces the secondary outlet in the fully closed position of the hybrid valve member. The hybrid valve member includes a valve member seal which extends around an outer periphery of the hybrid valve member. The valve member seal is arranged to radially seal against an interior surface of the housing such that the valve member seal prevents a flow between the inlet and the primary outlet in the fully closed position of the hybrid valve member. The valve member seal is disposed within a plane which is transverse to the actuation axis.

The valve may also include a valve shoe. The valve shoe is adjacent the secondary outlet and is biased against the hemispherical portion of the hybrid valve member to prevent a flow from the inlet to the secondary outlet in the fully closed position.

In yet another aspect, the invention provides a valve with a reduced weight and size envelope based in part upon a hybrid valve element and the sealing arrangement associated therewith. An embodiment according to this aspect includes a housing. The housing has an inlet, a primary outlet, and a secondary outlet. A hybrid valve member is rotatably positioned within the housing. The hybrid valve member includes a planar portion and a hemispherical portion on a first side thereof. A first seal arrangement and a second seal arrangement are also provided. The first seal arrangement sealingly engages an interior surface of the housing. A second seal arrangement sealingly engages the hemispherical portion of the hybrid valve member.

An aperture is formed through the hemispherical portion, such that the planar portion is exposed to a flow passing through the aperture. The aperture is selectively alignable with the secondary outlet such that a flow path extends between the inlet, the aperture, and the secondary outlet in at least a partially opened position of the hybrid valve member.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-9 illustrate an exemplary embodiment of a valve and valve system according to the teachings of the present invention. As will be explained in greater detail below, the valve and valve system shown and described herein advantageously overcomes existing problems in the art by providing a single valve with a single valve member which is operable to govern multiple bleed flows from a compressor of a turbine engine. The valve and valve system described herein achieves the foregoing with a reduced weight and size footprint and lower actuation force requirements.

Figure 1:
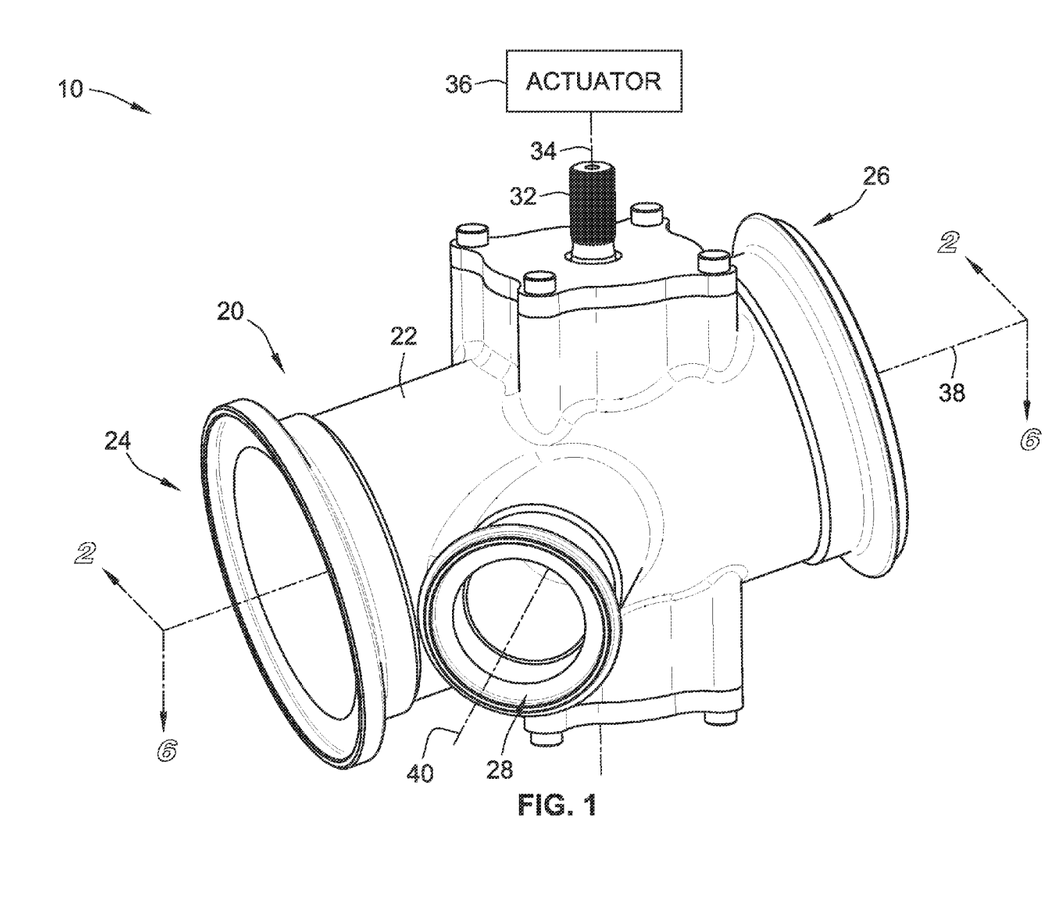
FIG. 1 is a perspective view of an exemplary embodiment of a combined butterfly/ball valve according to the teachings of the present invention.

Turning first to FIG. 1, the same illustrates an embodiment of a valve system 10 according to the teachings of the present invention. Valve system 10 includes a valve 20.

Valve 20 has an outer housing 22 with an inlet 24, a primary outlet 26 and a secondary outlet 28. Without restricting the applicability of the invention described herein from other applications, inlet 24 may be connected to a section of a compressor of a turbine engine. A compressor bleed flow may be received through inlet 24 and selectively passed through primary outlet 26 for primary bleed flow functions such as pneumatic actuation of aircraft actuators. This bleed flow may also selectively pass through secondary outlet 28 for secondary bleed flow functions such as anti-icing. The foregoing functions are purely for example, and those of skill in the art will readily recognize that primary outlet 26 and secondary outlet 28 may be connected to other portions of an aircraft to provide various functionality.

To achieve the foregoing, a valve member 30 (See e.g. FIG. 2) is disposed within an interior of housing 22. Valve member 30 is operably coupled to a valve stem 32 which extends along an actuation axis 34 of valve 20. An actuator 36 (shown schematically herein) is coupled to valve stem 32 to rotate the same about actuation axis 34 ultimately to govern a position of valve member 30 within housing 22.

Actuator 36 may be any appropriate actuator designed for actuating a valve-type apparatus. As non-limiting examples, actuator 36 may be a linear, rotary, hydraulic, fueldraulic, or an electromagnetic-type actuator.

Still referring to FIG. 1, inlet 24 and primary outlet 26 are arranged along a primary flow axis 38. Secondary outlet 28 is arranged along a secondary flow axis 40. As can be surmised from inspection of FIG. 1, as well as from reference to FIGS. 6-9, secondary flow axis 40 is transverse to primary flow axis 38 at an angle θ which is less than 90°. Such an arrangement should be taken by way of example only, as it is entirely conceivable that secondary outlet 28 may be arranged along a secondary flow axis which is greater than or equal to 90° in other embodiments.

Figure 2:
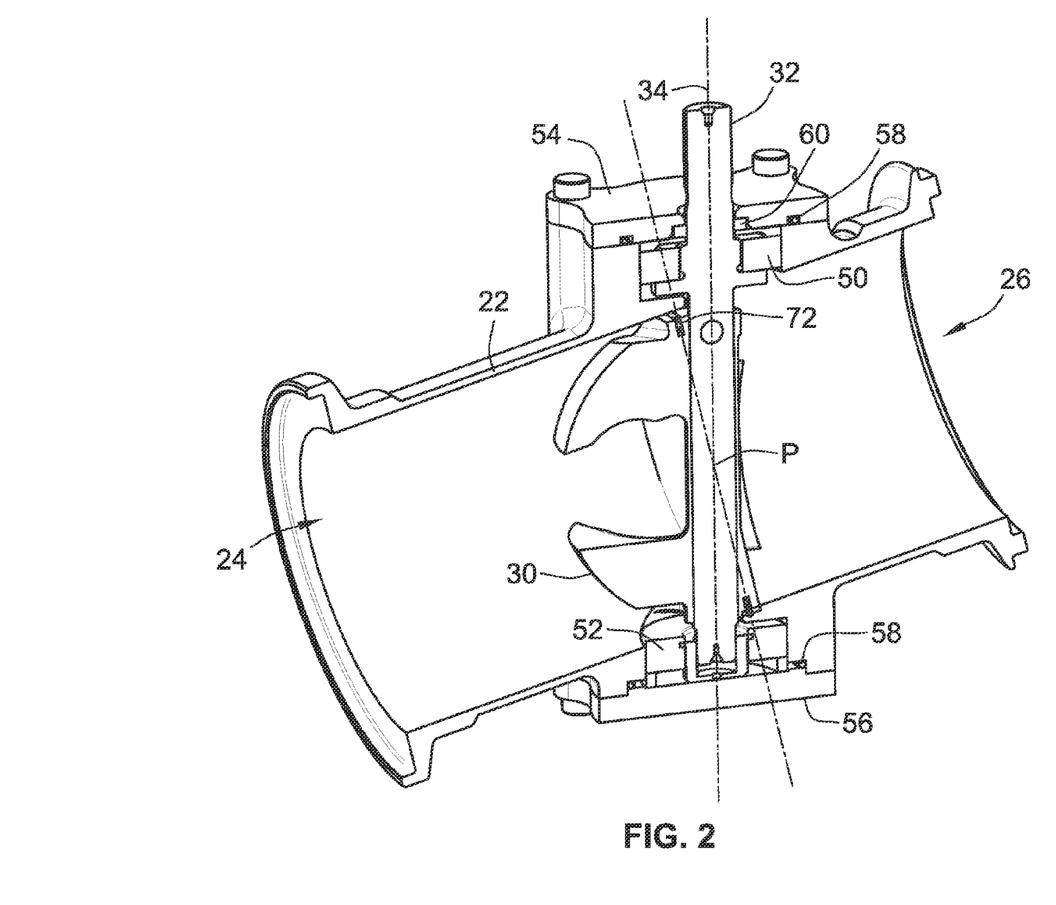
FIG. 2 is a perspective cross section of the valve of FIG. 1.

Turning now to FIG. 2, valve 20 is shown in a cross-section to expose the internal componentry thereof. Valve member 30 and valve stem 32 are rotationally supported relative to housing 22 by first and second bearings 50, 52. A first housing cap 54 encloses first bearing 50 as shown, while a second housing cap 56 encloses second bearing 52 as shown. Appropriate seals 58 are positioned between first and second housing caps 54, 56 to prevent leakage at the interface between first and second housing caps 54, 56 and the remainder of housing 22. Additionally, a valve stem seal 60 is provided around upper portion of valve stem 32 to prevent leakage at the area where valve stem 32 extends through housing 22 to engage actuator 36 (See FIG. 1).

As will be described in greater detail below, valve member 30 also includes a valve member seal 72 which is disposed within a plane P that is transverse to actuation axis 34 as can be seen in FIG. 2. This valve member seal 72 provides a first seal arrangement of valve 20.

Figure 3:
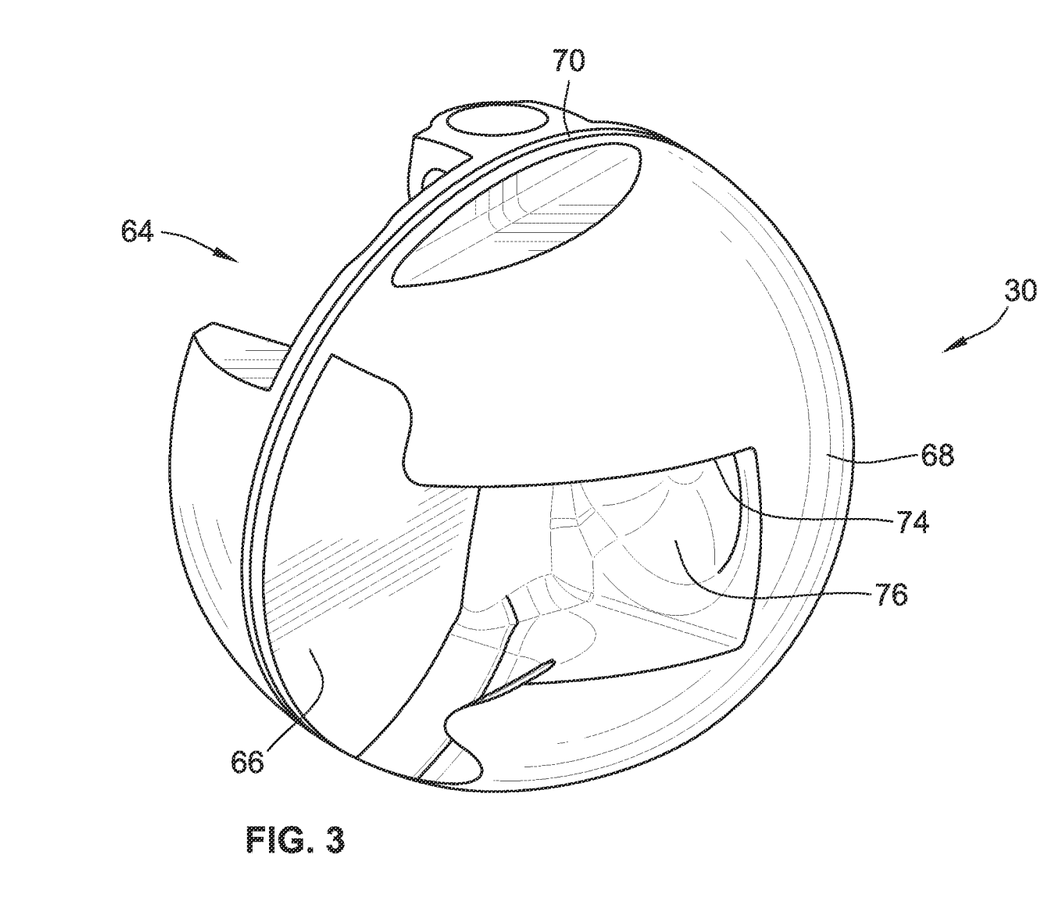
FIGS. 3-5 are a perspective views of a valve member of the valve of FIG. 1.
Figure 4:
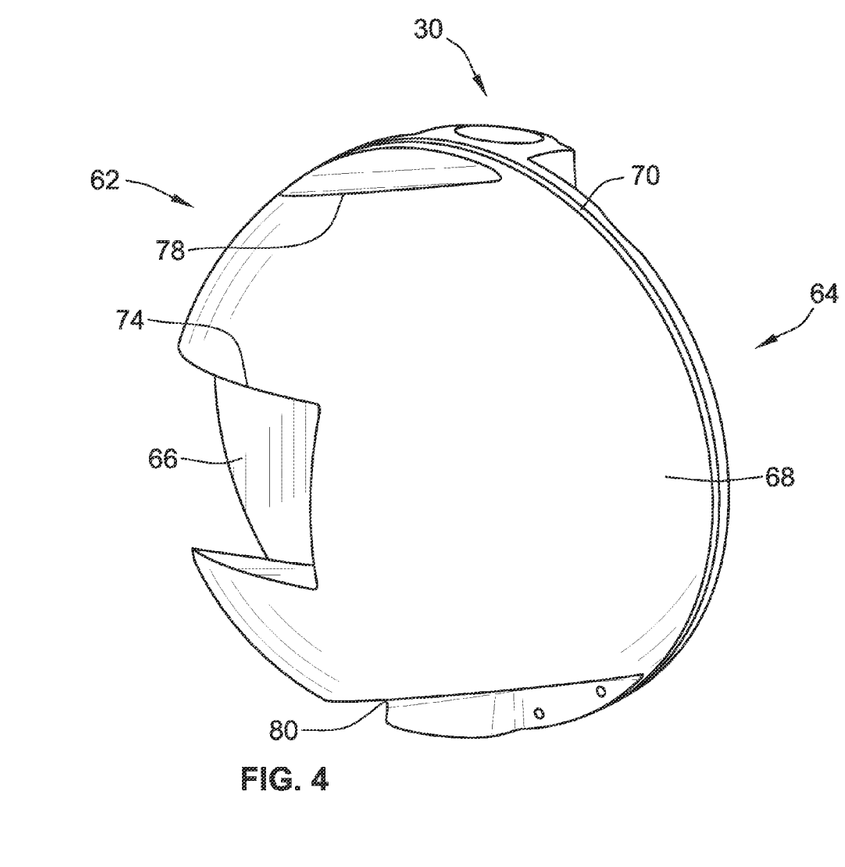
Figure 5:
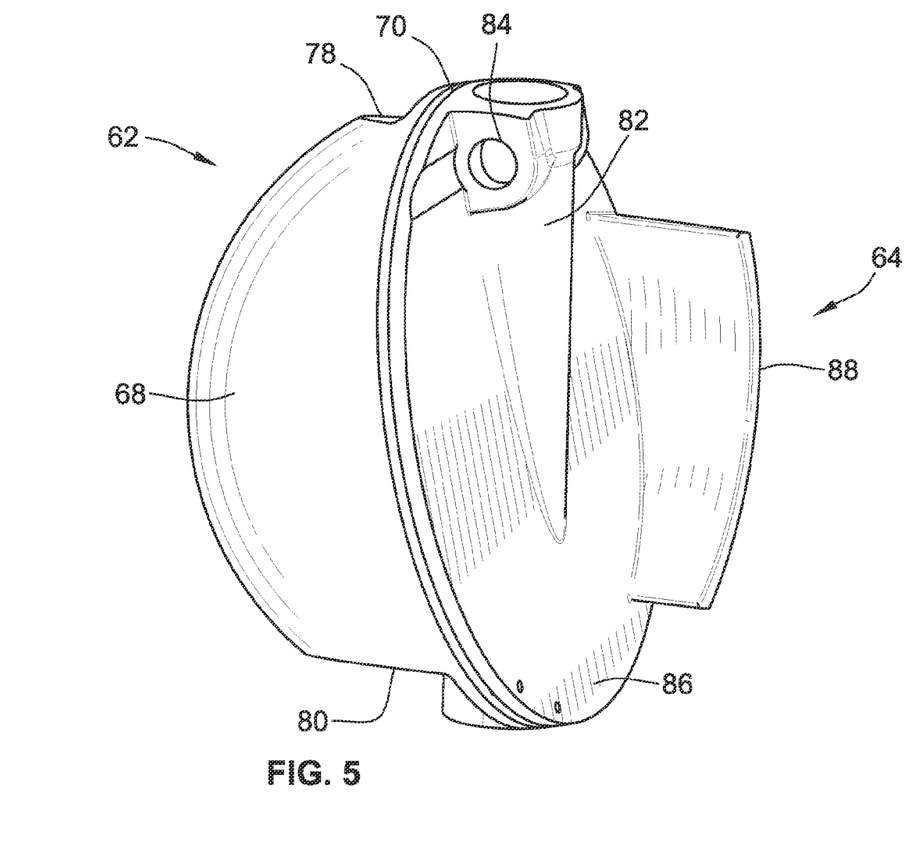

Turning now to FIGS. 3-5, valve member 30 will be described in greater detail. With particular reference to FIG. 3, valve member 30 may be considered to be a hybrid valve member that includes portions thereof which are indicative of a butterfly valve-style valve member, but also portions which are indicative of a ball valve-style valve member. More specifically, valve member 30 includes a first side 62 and a second side 64. First side 62 includes a planar portion 66 and a hemispherical portion 68.

As will be readily recognized by those of skill in the art, planar portion 66 resembles a face of a butterfly valve element, while hemispherical portion 68 resembles a portion of a ball valve member. A seal groove 70 is interposed between first and second sides 62, 64 to receive valve member seal 72 introduced above relative to FIG. 2.

A slotted aperture 74 is formed in hemispherical portion 68. Slotted aperture 74 is selectively alignable with secondary outlet 28 as will be described in greater detail below relative to FIGS. 6-9. Hemispherical portion 68 also includes a pocket 76 which is generally adjacent a center axis of valve member 30. Pocket 76 advantageously provides a contoured surface which aids in smoothing out the flow contour in this region, as well as prevents an undesirable pressure drop or recirculation zone.

Turning now to FIG. 4, hemispherical portion 68 also includes cut-outs 78, 80 to thereby reduce the overall weight of valve member 30 as well as provide more flow area between inlet 24 and primary outlet 26. With reference now to FIG. 5, valve member 30 also includes a receiving feature 82 which extend partially through second side 64 as well as first side 62. Receiving feature 82 receives valve stem 32 (See FIG. 2). An aperture 84 is also formed through receiving feature 82 for receipt of a fastener to fixedly retain valve member 30 relative to valve stem 32.

As can also be seen in FIG. 5, second side 64 includes a planar surface 86 from which a flow feature 88 extends from. This flow feature 88 is positioned at a peripheral edge of valve member 30 and extends along a portion of the outer periphery thereof. Flow feature 88 acts as a dam or restriction to the flow when valve member 30 is an partially or fully open position. This restriction acts to introduce or build up a higher pressure adjacent inlet 24 so that the flow is urged under this pressure build up towards secondary outlet 28 in addition to flowing through primary outlet 26. It should be noted that the particular shape of flow feature 88 illustrated is for exemplary purposes only, and other shapes may be utilized. Further, flow feature 88 may be entirely omitted in other embodiments.

Figure 6:
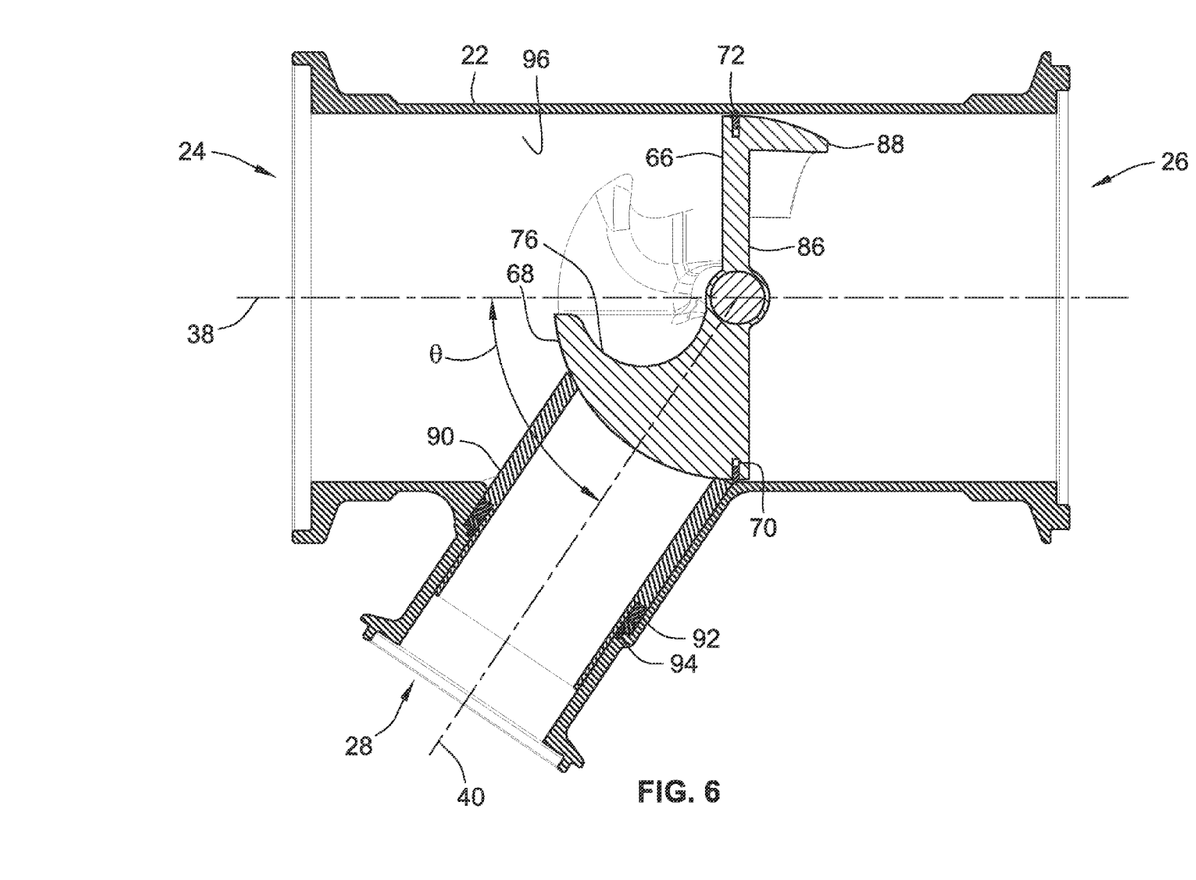
FIGS. 6-9 are cross sectional views of the valve of FIG. 1, showing several operational states thereof.

Turning now to FIGS. 6-9, the various operational positions of valve member 30 will be described. Turning first to FIG. 6, valve member 30 is shown in a fully closed position. As a result, flow from inlet 24 to primary outlet 26 as well as from inlet 24 to secondary outlet 28 is prevented. As can also be seen in this view, the first seal arrangement provided by valve member seal 72 is shown. Valve member seal 72 sealingly engages an interior surface 96 of housing 22 in the fully closed position. Also shown in FIG. 6 is a second seal arrangement formed between valve member 30 and secondary outlet 28. This seal arrangement includes a valve shoe 90.

This valve shoe 90 is biased by a biasing element 92 into engagement with hemispherical portion 68 as shown. As can be seen in FIG. 6, an end edge of valve shoe 90 which engages hemispherical portion 68 is tapered so that it generally assumes the same outer peripheral shape of hemispherical portion 68. This close geometrical compliance combined with the biasing force provided by biasing element 92 provides a seal between hemispherical portion 68 and valve shoe 90 in the fully closed position. An additional seal 94 is provided adjacent biasing element 92 to prevent or minimize leakage at the interface between valve shoe 90 and housing 22.

Figure 7:
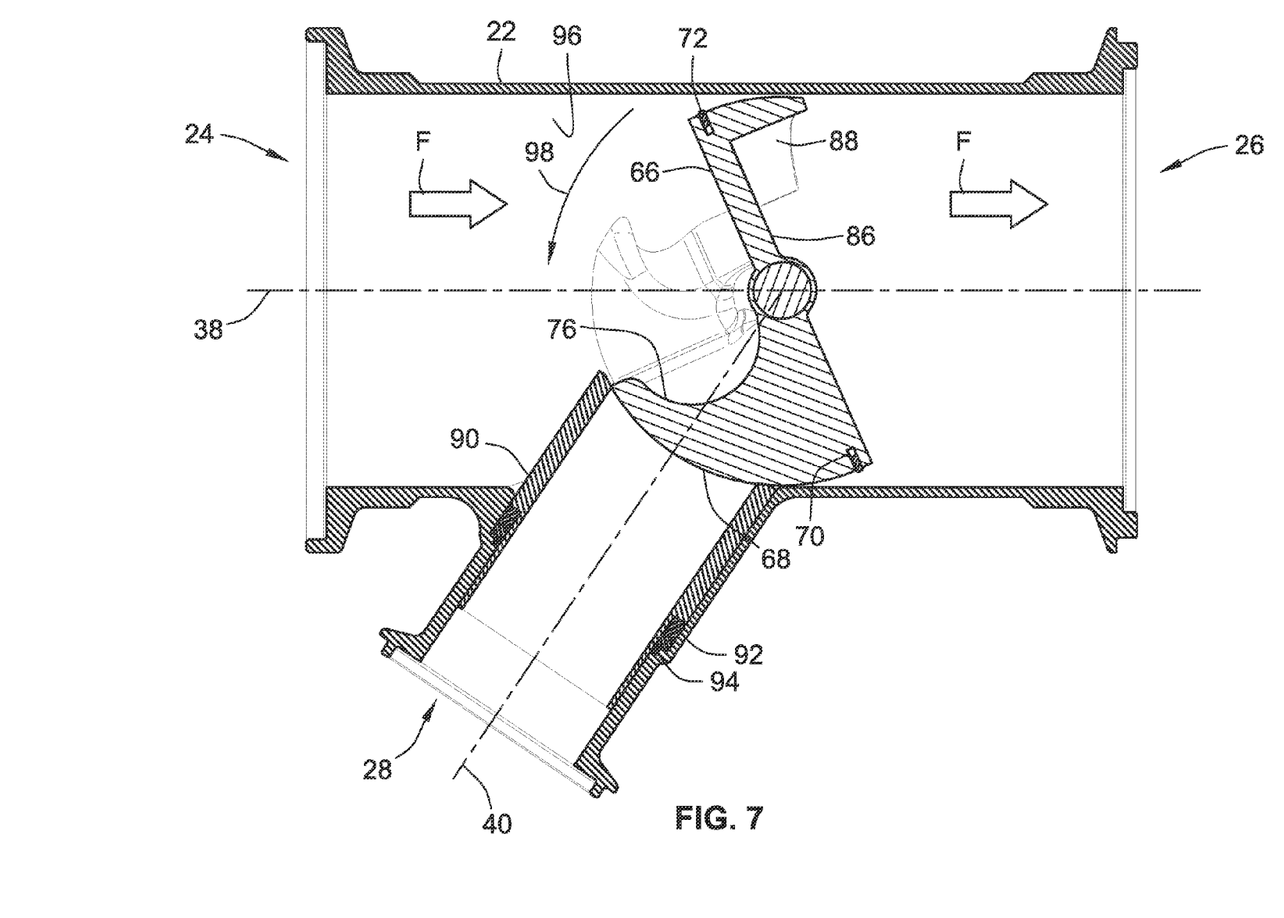

Turning now to FIG. 7, valve member 30 has been partially rotated in rotational direction 98 such that the seal formed between valve member seal 72 and interior surface 96 is broken. As a result, a flow F is permitted between inlet 24 and primary outlet 26. As can be seen from inspection of FIG. 7, however, valve shoe 90 still fully engages hemispherical portion 68 such that flow from inlet 24 through aperture 74 is prevented.

Figure 8:
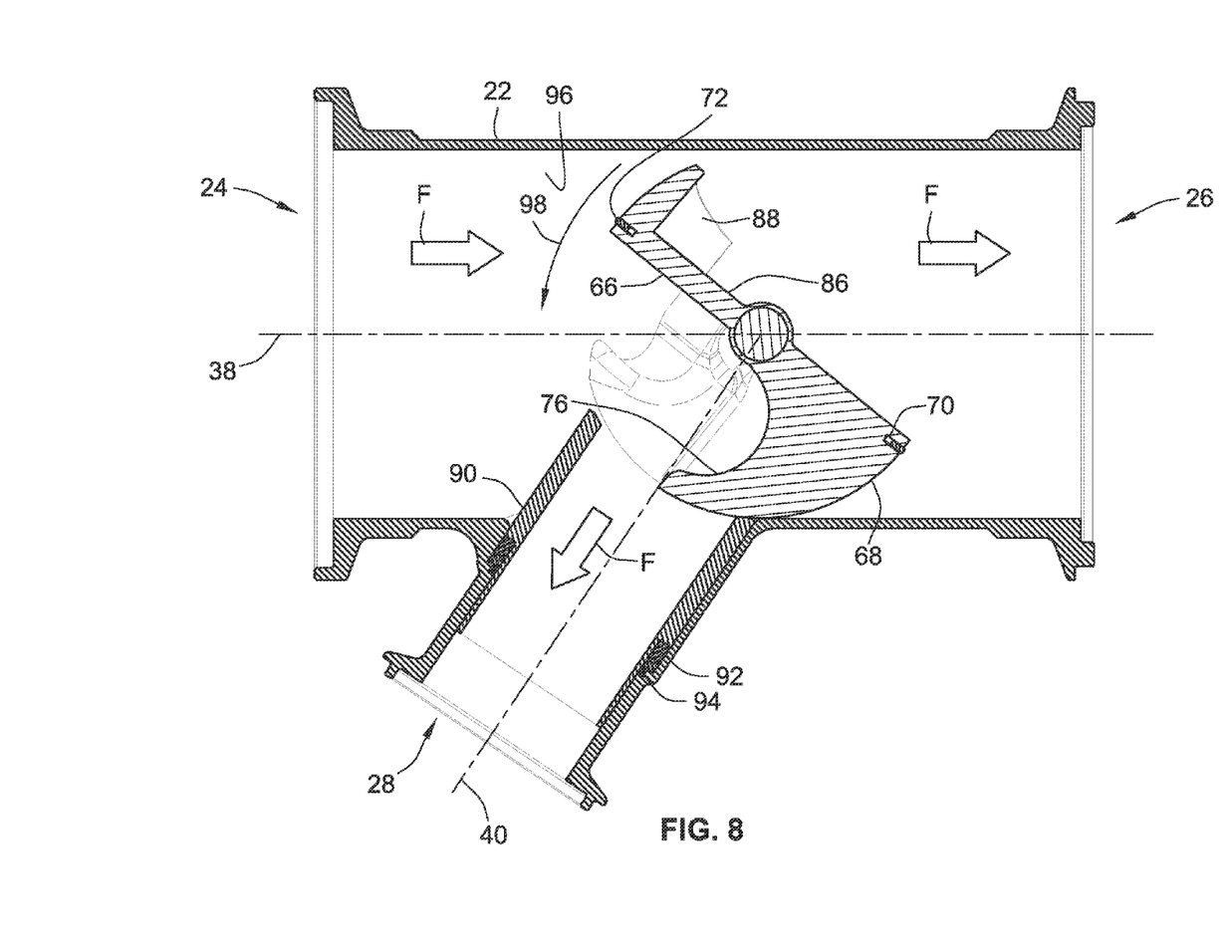

However, and referring now to FIG. 8, continued rotation of valve member 30 in rotational direction 98 will also open a flow path from inlet 24 through aperture 74 and secondary outlet 28. As a result, a flow F is permitted from inlet 20 to each of primary and secondary outlets 26, 28.

Figure 9:
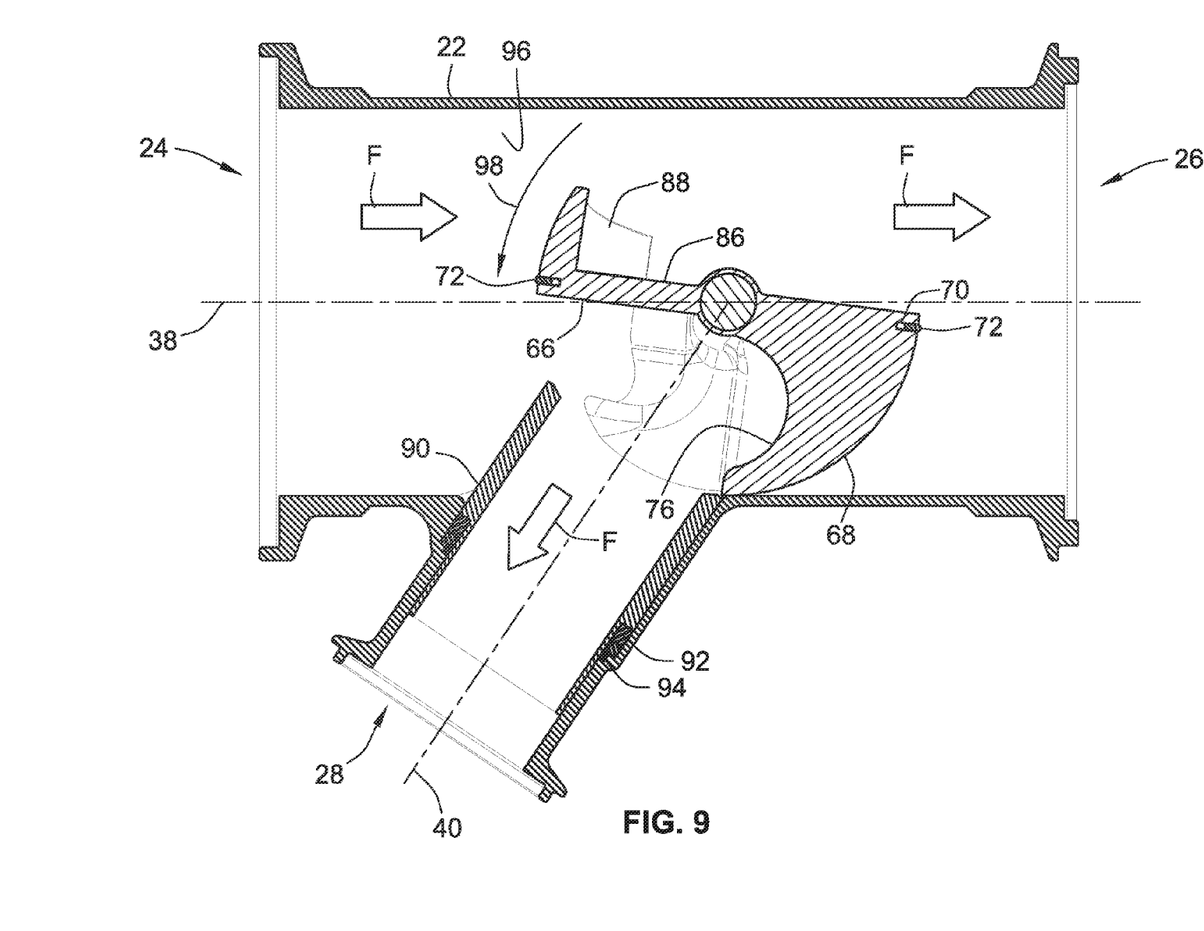

Referring finally to FIG. 9, continued rotation of valve member 30 of in-rotational direction 98 will position valve member 30 such that the flow path between inlet 24 and primary and secondary outlets 26, 28 is fully opened. In this fully opened position, valve member 30 presents a minimized flow restriction relative to the flow F from inlet 24 to primary outlet 26 as well as from inlet 24 to secondary outlet 28.

As can also be seen from inspection of FIGS. 6-9, valve member 30 presents a generally minimized construction in both size and width while also achieving structural features of both a butterfly valve member as well as a ball valve member. This construction allows for a first and second seal arrangement as described above which permits for a reduction in actuation forces. As a result, actuator requirements of valve assembly 10 (See FIG. 1) are substantially reduced. This has the advantage of allowing for an overall reduced weight and size of the assembly.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve comprising:
a housing, the housing having an inlet, a primary outlet, and a secondary outlet;
a hybrid valve member rotatably positioned within the housing, the hybrid valve member having a fully closed position wherein the hybrid valve member prevents flow between the inlet and the primary outlet and prevents flow between the inlet and the secondary outlet, the hybrid valve member including a planar portion and a hemispherical portion on a first side thereof;
wherein the planar portion faces the inlet in the fully closed position and wherein the hemispherical portion faces the secondary outlet in the fully closed position;
wherein the hybrid valve member has a second side in an opposed relationship to the first side, wherein the second side includes a planar portion; and
wherein a seal groove is interposed between the first and second sides.

2. The valve of claim 1, wherein a seal is positioned within the seal groove and provides a radial seal between the hybrid valve member and an interior surface of the housing.

3. The valve of claim 1, further comprising a flow feature extending away from the planar portion of the second side.

4. The valve of claim 3, wherein the flow feature is positioned at an outer periphery of the hybrid valve member, the flow feature extending partially along the outer periphery of the hybrid valve member.

5. The valve of claim 1, wherein the hemispherical portion also faces the inlet in the fully closed position.

6. A valve comprising:
a housing, the housing having an inlet, a primary outlet, and a secondary outlet;
a hybrid valve member rotatable positioned within the housing, the hybrid valve member having a fully closed position wherein the hybrid valve member prevents flow between the inlet and the primary outlet and prevents flow between the inlet and the secondary outlet, the hybrid valve member including a planar portion and a hemispherical portion on a first side thereof; and
wherein the planar portion faces the inlet in the fully closed position and wherein the hemispherical portion faces the secondary outlet in the fully closed position; and
wherein an aperture is formed through the hemispherical portion, such that the planar portion is exposed to a flow passing through the aperture.

7. The valve of claim 6, wherein the aperture is selectively alignable with the secondary outlet such that a flow path extends between the inlet, the aperture, and the secondary outlet upon a rotation of the hybrid valve member from the fully closed position.

8. The valve of claim 7, wherein the aperture is an elongated slot having an open side.

9. The valve of claim 8, wherein the hemispherical portion includes an internal pocket, the internal pocket offset from a center axis of the hybrid valve member.

10. A valve comprising:
a housing, the housing having an inlet, a primary outlet, and a secondary outlet;
a hybrid valve member rotatably positioned within the housing, the hybrid valve member having a fully closed position wherein the hybrid valve member prevents flow between the inlet and the primary outlet and prevents flow between the inlet and the secondary outlet, the hybrid valve member including a planar portion and a hemispherical portion on a first side thereof;
wherein the planar portion faces the inlet in the fully closed position and wherein the hemispherical portion faces the secondary outlet in the fully closed position,
the valve further comprising a valve shoe, the valve shoe adjacent the secondary outlet and biased against the hemispherical portion to prevent a flow from the inlet to the secondary outlet in the fully closed position.

* * * * *

UNITED STATES PATENT AND TRADEMARK OFFICE
CERTIFICATE OF CORRECTION

PATENT NO. : 9,574,499 B2  Page 1 of 1
APPLICATION NO. : 14/710688
DATED : February 21, 2017
INVENTOR(S) : Shawn J. Pollock et al.

It is certified that error appears in the above-identified patent and that said Letters Patent is hereby corrected as shown below:

In the Claims

Column 8, Line 34, Claim 10, Line 14, delete "position," and replace with --position;--

Signed and Sealed this
Twenty-fifth Day of April, 2017

Michelle K. Lee
*Director of the United States Patent and Trademark Office*